July 12, 1927. 1,635,569
C. H. AYARS
VEGETABLE TOPPING MACHINE
Filed Aug. 30, 1926 2 Sheets-Sheet 1
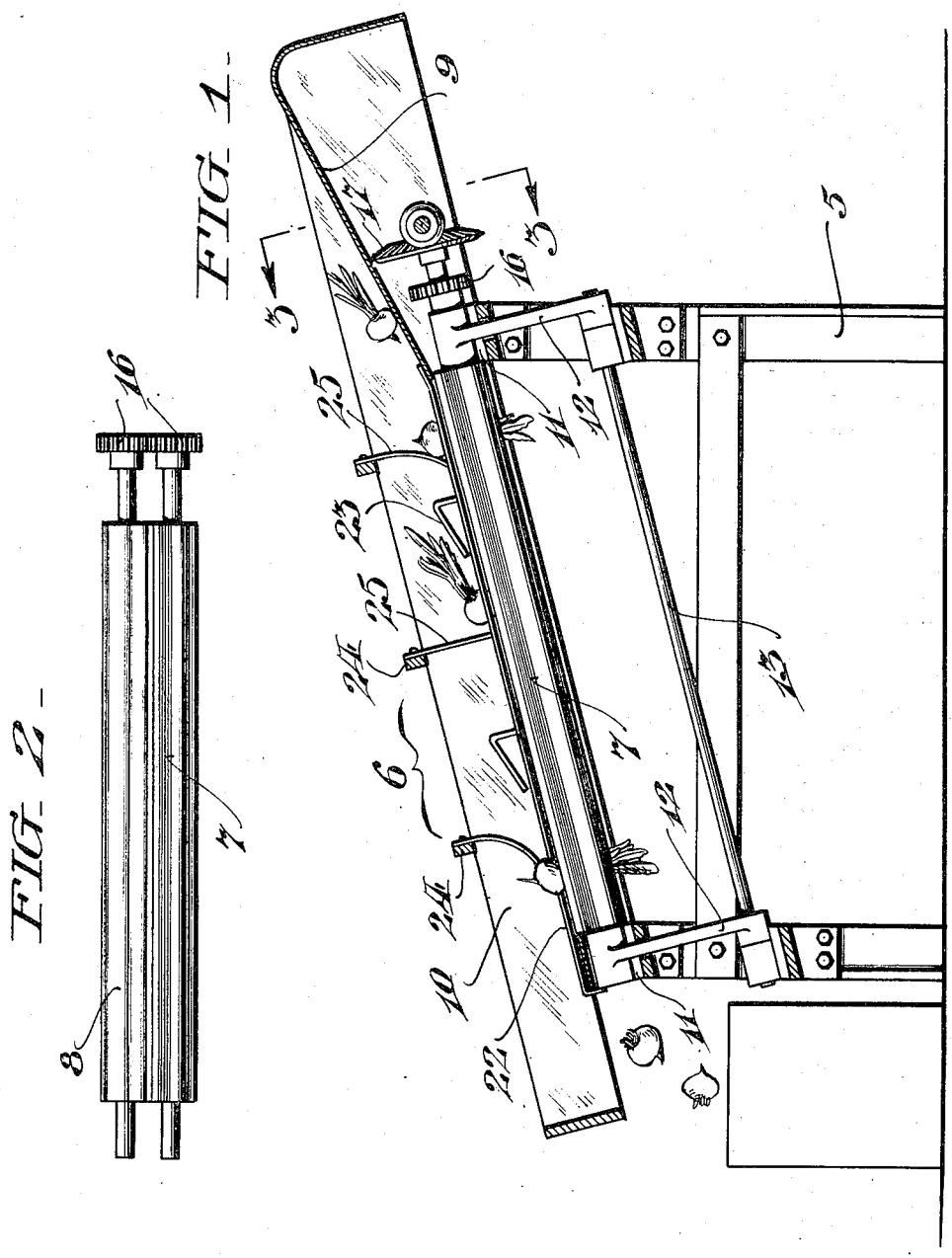
WITNESSES
Alfred E. Ischinger
Wesley P. Merrill
INVENTOR
Charles H. Ayars,
BY
Joshua R. H. Potts
ATTORNEY July 12, 1927.

C. H. AYARS 1,635,569

VEGETABLE TOPPING MACHINE

Filed Aug. 30, 1926

2 Sheets-Sheet 2

WITNESSES:
Alfred E. Zschinger
Wesley Merrill

INVENTOR:
Charles H. Ayars,
BY Joshua R. H. Potts
ATTORNEY

Patented July 12, 1927.

1,635,569

UNITED STATES PATENT OFFICE.

CHARLES H. AYARS, OF SALEM, NEW JERSEY, ASSIGNOR TO AYARS MACHINE COMPANY, OF SALEM, NEW JERSEY.

VEGETABLE-TOPPING MACHINE.

Application filed August 30, 1926. Serial No. 132,331.

My invention relates to rolls for vegetable topping machines, and more particularly to rolls for machines of the type described in my application for Letters Patent on improvements in vegetable topping machines, filed January 16, 1926, Serial No. 81,703.

One of the objects of my invention is to provide rolls that will more efficiently drag the vegetable tops between them and into position for topping, than is done by the rolls now in use.

Another object is to so design the rolls that undersized vegetables will not be caught between the rolls and crushed.

Figure 3:
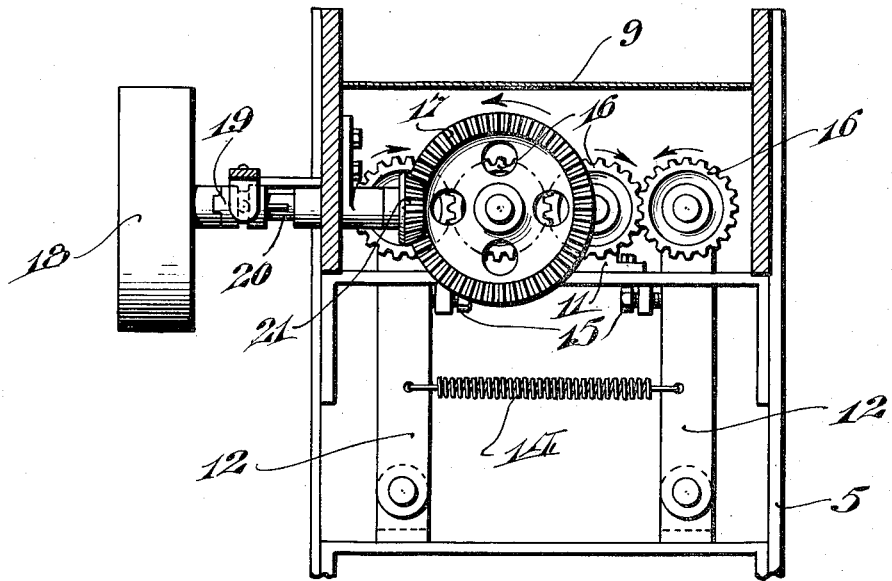
Figure 4:
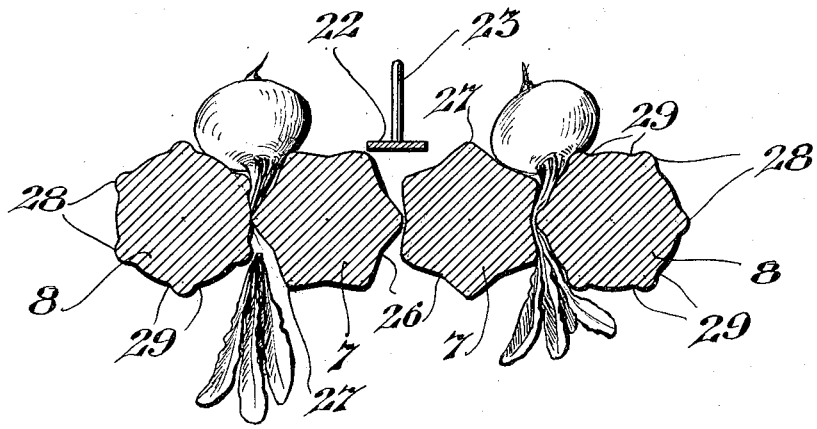

These objects, and other advantageous ends which will be described hereinafter, I attain in the following manner, reference being had to the accompanying drawings in which Figure 1 is a longitudinal vertical sectional view of a vegetable topping machine, on which my improved rolls have been installed, Figure 2 a plan view of a pair of my improved rolls, Figure 3 an end view, partly in section, taken on line 3—3 of Figure 1, and drawn to a larger scale, and Figure 4 is a cross sectional view of two pairs of my improved rolls, drawn to a still larger scale and showing the rolls in two positions.

Referring to the drawings, 5 indicates the frame of the machine, 6 an inclined feed chute. 7 and 8 a pair of my improved rolls, which will be described hereinafter and which form the bottom of the chute for the greater part of its length, and 9 an inclined plate forming, with the sides 10 of the chute, a hopper adapted to direct the vegetables onto the faces of the rolls.

In the machine illustrated, two pairs of rolls are shown with the inner rolls rotatably mounted in bearings 11, carried by a frame member, and the outer rolls rotatably mounted in bearings in arms 12 pivoted to rods 13 on each side of the machine. The arms on one side of the machine are connected to the arms on the opposite side by means of coiled springs 14; the tension of which presses the outer rolls toward the inner rolls and the inward movement of the arms is limited by adjustable stops 15.

Gears 16 are rigidly secured to the upper end of the rolls, meshing with one another to form a train, and a bevel gear 17 is also rigidly secured to the upper end of one of the inner rolls.

Rotation, in the direction of the arrows shown in Figure 3, is imparted to the rolls through gears 16 and bevel gear 17 by means of power transmitted through pulley 18, clutch 19, shaft 20 and pinion 21.

When the machine is in operation, the vegetables slide down the upper faces of the rolls. A protecting strip 22 is placed over the space between the two pairs of rolls to prevent vegetables or their tops from falling therein. As some of the tops would have a tendency to slide down this strip and thus not be removed from the vegetables, I provide pins 23, extending upwardly from the strip 22, which retard the tops and swing them off the strip and onto the rolls.

Mounted across the upper edges of the chute sides 10, I provide a plurality of bars 24 from which flexible baffles 25 depend. These baffles retard the vegetables against too rapid a movement down the inclined chute.

Referring now more particularly to Figures 2 and 4, the rolls 7 may be described as being hexagonal in cross-section with the sides of the hexagon being depressed at their centers, as shown at 26, and each half-side sloping outwardly in a straight line for the greater part of its length and then being slightly curved to meet the corner 27 of the hexagon.

The roll 8 may be described as being primarily circular in cross-section and having six longitudinal ribs 28 spaced around its periphery. In practice, I find that having the cross section of the ribs representing slightly less than one half of a circle and being joined to the periphery of the roll by a large fillet 29, and having the diameter of the roll 8, out to out of the ribs, approximately the same as the long diameter of the roll 7, produces the best results.

While I have illustrated and described roll 7 as being approximately hexagonal in cross section and roll 8 as having 6 ribs, it is evident that rolls of other polygonal cross section might be used, provided that they were paired with rolls having a number of ribs equal to the number of corners on the polygonal roll. It is also evident that a series of button like projections may be substituted for the ribs on roll 8.

It will be noted that when the rolls are in the position shown in the right hand side of Figure 4, the rib 28 is in line with, but spaced from, the depression 26, and that the corner 27 of the roll 7 is opposite to, but spaced farther from, the space 29 between two ribs on roll 8, thus providing sufficient space for the tops but insufficient space for a vegetable of the smallest useable size. When the rolls are in the position shown in the left hand side of Figure 4, the corner 27 of roll 7 is adapted to meet the space 29 on roll 8 and remove the tops from the vegetable, as plainly shown.

In operation, vegetables are dumped into the hopper and carried onto the rolls by gravity, due to the inclination of the bottom 9. Tops riding on the strip 22 are forced off and onto the rolls by the pins 23. The rolls of each pair rotate toward each other and the corners 27 and ribs 28 force the tops between the rolls where they are removed as previously described.

While I have described my invention as taking a particular form and as being applied to a specific machine, it will be understood that various modifications as to shape, proportion and application might be made without departing from the spirit thereof, and hence I do not limit myself to the precise construction set forth but consider that I am at liberty to make such changes, alterations and applications as fairly come within the scope of the appended claims.

Having thus described my invention, what I claim as new and desire to secure by Letters Patent is:—

1. A pair of vegetable topping rolls comprising a roll having a cross-sectional outline corresponding substantially to a polygon with the sides of the polygon depressed, and a roll of substantially circular cross section having projections formed on its surface, said projections being adapted to register with the depressions in the companion roll in a spaced relation therefrom, the corners of said companion roll being adapted to contact with the walls of the other roll between the projections thereon.

2. A pair of vegetable topping rolls comprising a roll having a cross-sectional outline corresponding substantially to a hexagon with the sides of the hexagon depressed, and a roll of substantially circular cross section having projections formed on the surface of the roll, and surfaces provided between the projections adapted to abut the corners of its companion roll.

3. A pair of vegetable topping rolls comprising a roll having a cross-sectional outline corresponding substantially to a hexagon with the sides of the hexagon depressed, each half of the depressed side extending outwardly and having its end deflected to meet the corner of the hexagon, and a roll of substantially circular cross-section having ribs adapted to register with the depressions in its companion roll, the corners of said hexagonal shaped roll acting as cutters in contact with the spaces between the ribs on the circular shaped roll.

4. A pair of vegetable topping rolls comprising a roll having a cross-sectional outline corresponding substantially to a hexagon with the sides of the hexagon depressed, each half of the depressed side extending outwardly and having its end deflected to meet the corners of the hexagon, and a roll of substantially circular cross-section having ribs of arcuate cross-sectional outline spaced around its periphery and having fillets joining the edges to the surface of the roll.

5. A pair of vegetable topping rolls comprising a roll having a plurality of sides with the portions between the corners depressed, and a second roll of substantially circular cross section having projections thereon, the corners of said first roll registering between the projections on the second roll, the projections on the second roll registering in the depressions of the first roll, said corners on the first roll acting as cutters.

In testimony whereof I have signed my name to this specification.

CHARLES H. AYARS.